United States Patent [19]

Kingsland

[11] 4,135,812

[45] Jan. 23, 1979

[54] MAGNIFICATION CHANGE MECHANISM

[75] Inventor: David O. Kingsland, Fairport, N.Y.

[73] Assignee: Xerox Corporation, Stamford, Conn.

[21] Appl. No.: 807,939

[22] Filed: Jun. 20, 1977

[51] Int. Cl.[2] ...................... G03B 27/48; G03B 27/50; G03B 27/70

[52] U.S. Cl. .......................................... 355/51; 355/8; 355/11; 355/60; 355/65

[58] Field of Search ................... 355/8, 11, 50, 51, 57, 355/65, 66, 60

[56] References Cited

U.S. PATENT DOCUMENTS

| | | | |
|---|---|---|---|
| 3,614,222 | 10/1971 | Post et al. | 355/60 X |
| 3,884,574 | 5/1975 | Doi et al. | 355/66 |

*Primary Examiner*—Richard A. Wintercorn

[57] ABSTRACT

Optical projection apparatus utilizing a pulley and cable mechanism for positioning optical components thereof which comprises a fixed pulley means, translatable pulley means and cable means entrained about the foregoing means. A clutch is provided to selectively preclude rotational movement of the fixed pulley means while translational movement is imparted to the translatable pulley means to thereby effect repositioning of the translatable pulley means relative to the fixed pulley means. An optical component fixed for movement with the translatable pulley means and an optical component fixed for movement with the cable can thereby be repositioned relative to each other by effecting translational movement of the translatable pulley means while simultaneously preventing rotational movement of the fixed pulley means. With rotational movement imparted to the fixed pulley means the optical components move either in the same direction or in opposite directions depending upon the manner in which the cable is wrapped about the translatable pulley means.

16 Claims, 3 Drawing Figures

MAGNIFICATION CHANGE MECHANISM

BACKGROUND OF THE INVENTION

The present invention relates to xerographic copying apparatus or the like and more particularly to copying apparatus wherein various size copies can be reproduced from a single document or the same size copy can be reproduced from different size documents.

In the type of copying apparatus herein contemplated, light rays or images are reflected from successive portions of an original document which is supported on a transparent platen. The light rays are provided by an illumination source which together with a reflector or mirror is supported for movement relative to the document supported on the platen. As the mirror is moved past the document, the light rays reflected from the document impinge upon the mirror and, in turn, are reflected onto a mirror cluster from which they are directed through a lens and finally impinge on a fixed mirror which redirects the light rays onto a photosensitive material, commonly carried on a rotatable drum, the drum being adapted for movement in the same direction and at the same speed as the illumination source and first mirror mentioned above. In the foregoing manner, images of successive portions of the original document are flowed onto successive portions of the photosensitive drum to thereby produce a latent image of the document in accordance with well-known techniques. It is necessary in producing a copy of the document by the foregoing type of optical projection system to maintain constant the distances over which the light rays travel from the document to the lens and from the latter to the photosensitive drum or at least a constant ratio therebetween should be maintained. This can be accomplished by the provision of a stationary lens, and first and second mirror assemblies which direct the light rays from the document and which are movable with respect to one another, the second mirror assembly being moved at half the speed of the first mirror assembly whereby the document to lens distance is maintained constant. It will be appreciated that such a copying apparatus cannot reproduce copies of the original at more than one magnification ratio which is usually a one-to-one ratio.

One technique for enabling a copier apparatus to make copies at more than one magnification has been to provide the copier with a plurality of lenses having different magnifying powers, and to substitute one lens for another, according to the degree of magnification desired.

In other copying apparatus it is known to make copies of documents at different magnifications by moving a lens simultaneously with reflecting mirrors, the lens generally being moved a much smaller distance than the mirrors.

Still other copiers of the prior art have been provided with variable magnification means wherein an add lens is provided to compensate for the lens movement.

Still further copiers have been provided with combination cable, cam and cam followers and associated linkages for effecting repositioning of the lens and certain mirrors of the optical projection system. Similarly, chains and gear sets have been provided for such purposes.

All of the foregoing embodiments for providing a variable magnification copier fall short of being simple in construction, simple to operate and simultaneously provide precise adjustment of the lens and associated mirrors when changing from one magnification ratio to another.

Accordingly, it is the general object of this invention to provide an improved copying apparatus capable of making copies of documents at different magnifications.

It is another object of this invention to provide a copying apparatus permitting different magnifications which is simple in construction, easy to operate and yet provides for precise relative repositioning of optical components when moving the components to accommodate different magnifications.

Another object of this invention is to provide an optical projection system capable of precision adjustment of the half-rate mirror relative to the full rate mirror and the lens to compensate for nominal production variations in lens focal length.

Still another object of the invention is to provide a magnification charge mechanism cable of precision adjustment in the conjugate distances when charging magnification while maintaining stiffness in the system to prevent distortion during scanning.

Yet another object of this invention is to provide a cable and pulley arrangement for accomplishing conjugate length adjustment thereby avoiding the chordal noise inherent in chains and gear sets heretofore employed for such purpose.

Still yet another object of this invention is to provide a cable and pulley arrangement for driving a first optical projection component at a first speed and driving a second optical projection component at a second speed equal to half said first speed.

BRIEF SUMMARY OF THE INVENTION

The above-cited objects are accomplished by the provision of a pulley and cable mechanism for utilization in an optical projection apparatus for use in a xerographic reproducing machine or the like.

The cable and pulley mechanism comprises a translatable pulley means and fixed pulley means having a cable entrained thereabout. The translatable pulley means is constrained such that rotation of the fixed pulley effects wrapping of the cable and translation of the translatable pulley means. A selectively operable clutch is provided for preventing rotation of the fixed pulley while the translatable pulley means is translated. This enables the translatable pulley means to be repositioned relative to a fixed point on the cable. When the clutch is inoperative a full-rate mirror fixed for movement with the cable and a half-rate mirror fixed for movement with the translatable pulley means will be moved in synchronism upon rotation of the fixed pulley.

A second fixed pulley means and a second cable are provided wherein the second cable is wrapped about the translatable pulley means in such a manner as to cause movement of the half-rate mirror in a direction opposite to a lens attached to the second cable, when the lens is repositioned for varying the magnification of the optical system. A second selectively operable clutch is provided for preventing rotation of the second fixed pulley means when the first and second optical components are being transported by the first cable and translatable pulley means. To effect repositioning of the lens relative to the half-rate mirror, the selectively operable clutch associated with the first fixed pulley means is rendered operative to thereby not only effect the relative repositioning of the lens with respect to the half-rate mirror but also to effect relative repositioning of the half-rate mirror with respect to the full-rate mirror.

Other objects and advantages of the present invention will become apparent when considered in view of the description of the preferred embodiments as depicted in the drawings wherein:

FIG. 1 is a schematic representation of an optical scanning system adapted for utilization in a xerographic reproducing apparatus or the like;

DETAILED DESCRIPTION OF THE PREFERRED EMBODIMENT

Figure 1:
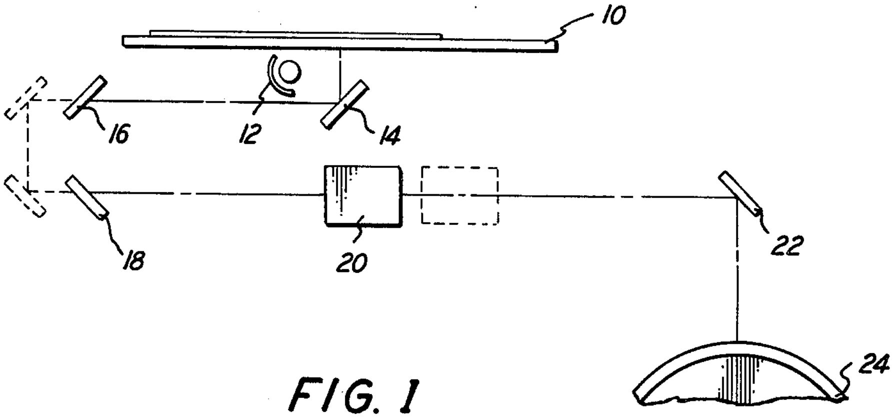

As shown in FIG. 1, the copying apparatus of the present invention comprises a transparent platen 10 for supporting documents to be copied.

In the preferred embodiment disclosed herein the documents are stationarily held on the platen and a moving optics system scans the document. However, as will be appreciated by those skilled in the art, the magnification charge mechanism forming the invention could be utilized in a copier apparatus wherein the optics remains stationary and the original document is moved past a fixed exposure station.

Original documents to be copied are illuminated by a lamp and reflector assembly 12 positioned below the transparent platen 10. The lamp and reflector assembly are supported for movement relative to the document by support means (not shown) which movement will cause light or image rays of successive portions of the document to be reflected therefrom in the direction of a scanning mirror 14 also supported for movement by means (not shown) in synchronism with the lamp and reflector assembly. The mirror 14 could be supported by the same support means as the lamp and reflector assembly. The light images are reflected by the mirror 14 in a direction that causes them to impinge upon a pair of mirrors 16 and 18 which form a mirror cluster to be discussed further hereinbelow which cluster is supported for movement in the same direction as the mirror 14 but at half the velocity or speed. The images reflected by the second mirror 16 of the mirror cluster are directed through a fixed focal length lens 20 and impinge on a fixed mirror 22 after which they are directed toward a photoreceptor drum 24.

The mirrors, lamp and reflector assembly together with the lens 20 form an optical projection system which is effective to project or reflect light images along an optical path emanating at the platen 10 and including the mirrors 14, 16 and 18, lens 20 and fixed mirror 22 and terminating at the photoreceptor 24. The portion of the optical path between the original document and the lens comprises the object conjugate distance while the portion of the optical path disposed between the lens and the photoreceptor drum comprises the image conjugate distance. As stated hereinabove, the object conjugate distance and the image conjugate distance must remain constant or at least remain in a constant ratio. Since, for a given magnification, the position of the lens and the fixed mirror 22 do not change during the scanning operation, the image conjugate distance remains constant. However, the positions of the mirrors 14, 16 and 18 do change during scanning. Therefore, in order to maintain the object conjugate distance constant, the movable mirror 14 is moved at a predetermined velocity in synchronism with the rotational speed of the photoreceptor drum and the mirrors 16 and 18 are moved at a velocity or speed equal to half the speed of mirror 14. The mirror 14 is commonly referred to as a full-rate mirror while the mirrors 16 and 18 are commonly referred to as half-rate mirrors.

Figure 2:
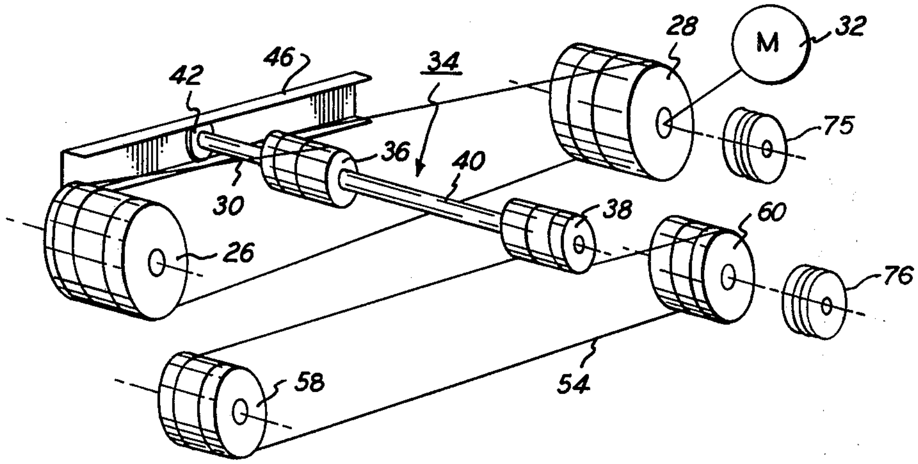
FIG. 2 is a perspective view of a pulley and cable mechanism for positioning optical elements or components of an optical projection system, with the optical components deleted.
Figure 3:
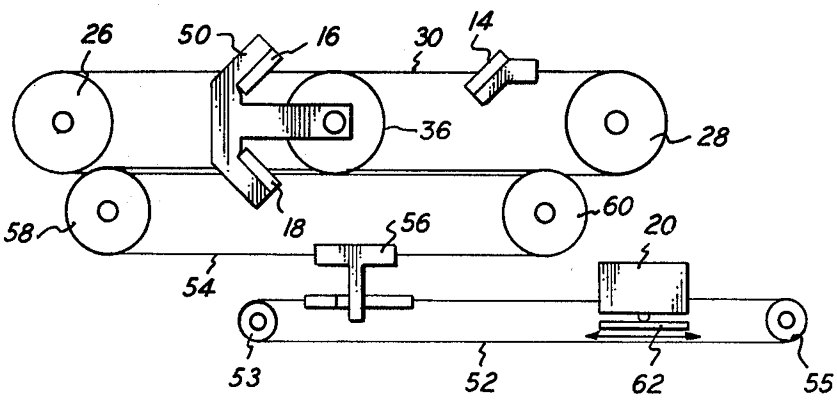
FIG. 3 is a schematic side elevational view of the mechanism shown in FIG. 3 but with the optical components present.

As viewed in FIG. 2, a drive mechanism is provided for accomplishing movement of the mirror 14 in synchronism with the photoreceptor 24 while moving the half-rate mirrors 16 and 18 at half the speed of the full-rate mirror 14. To this end, a pair of fixed pulleys 26 and 28 are provided about which an endless cable 30 is entrained. A multi-speed motor 32 is provided for effecting rotation of the pulley 28 in both the clockwise and counterclockwise directions. As will be appreciated, rotation of the pulley 28 will cause the cable 30 to wrap about the pulleys 26 and 28. The pulley 28 is rotated at a speed designed to cause the cable 30 to move in synchronism with the speed of the photoreceptor drum 24. Accordingly, the full rate mirror 14, as shown in FIG. 3, is connected to the cable 30 for movement therewith. In order to accomplish movement of the half-rate mirrors 14 and 16 at half the speed of the movement of mirror 14 by means of the cable 30, there is provided a translatable pulley assembly generally indicated by reference character 34. The pulley assembly 34 comprises pulleys 36 and 38 connected by means of a shaft 40 so that translation of pulley 36 about which cable 30 is wrapped to effect simultaneous rotation and translation of that pulley causes translation of the pulley 38.

In order to effect translation of the translatable pulley assembly 34 upon wrapping and unwrapping of the cable 30 about the pulley 36, the ends of the shaft 40 protruding through the pulleys 36 and 38 are provided with flanges 42 only one being shown which are received in parallel tracks 46 only one being shown. As shown in FIG. 3, the mirrors 16 and 18 are supported by a support member 50 which support member is connected to the shaft 40 for movement therewith. It will be appreciated that the translatable pulley assembly is moved at half the speed of the cable 30 at the point of connection with the mirror 14.

In order to insure that the relative position between the half-rate mirrors 16 and 18 and full-rate mirror 14 remains constant, the cable 30 is affixed to the pulley 36 by redundant wrapping as shown in FIG. 2.

In order to effect copying of a document supported on the platen 10 at different magnification ratios, the lens 20 is supported for movement between the solid line position and dotted line positions shown in FIG. 1. To this end, the lens 20 is connected to a cable 52 entrained about a pair of fixed pulleys 53 and 56, the cable 52 being clamped to a cable 54 by means of a clamp 56 (FIG. 3). The cable 54 is entrained about a pair of fixed pulleys 58 and 60 and the pulley 38, forming a part of the translatable pulley arrangement 34. As can be seen from FIG. 2, the cable 54 is entrained about the pulleys 58 and 60 in a manner similar to the wrapping of the cable 30 about the pulleys 26 and 28. However, the cable 54 is wrapped about the pulley 38 such that the cable is tangent to the pulley 38 at a position which is displaced 180° from that of the tangential relationship of the cable 30 with respect to pulley 36. By so wrapping the cable 54 about the pulley 38 the pulley 38 and lens

20 can be moved in opposite directions when the lens 20 is repositioned. To accomplish repositioning of the lens 20 a suitable drive mechanism, for example, a rack and pinion arrangement 62 (FIG. 3) is provided which can move the lens 20 both to the left and to the right as viewed in FIG. 3, the direction of movement depending upon the desired magnification ratio between the document and the image. When the lens is repositioned, for example, by movement to the right as viewed in FIG. 3, the cable 52 causes displacement of the cable 54. Accordingly, mirrors 16 and 18 connected to the translatable pulley assembly 34 around which cable 54 is wrapped, move to the left as viewed in FIG. 3. Conversely, when the lens 20 is moved to the left as viewed in FIG. 3 the mirrors 16 and 18 are moved in the opposite direction (i.e. to the right).

As noted above, the object conjugate distance is measured from the document to the lens while the image conjugate is measured from the lens to the photoreceptor surface. The total conjugate distance, therefore, the sum of the object and image conjugates can be represented by the relationship $TC = (f + f/m) + (f + fm)$ wherein:

$TC$ = Total Conjugate Distance
$f$ = Lens Focal Length
$m$ = Magnification
$f + f/m$ = Object Conjugate Distance
$f + fm$ = Image Conjugate Distance Where the magnification change accomplished by movement of the lens 20 represents a magnification ratio smaller than the previous magnification ratio then the object conjugate must be increased while the image conjugate is decreased. In other words when the lens is moved closer to the image plane or the photoreceptor drum surface then the half-rate mirrors must be moved farther away from the object plane (i.e. the top surface of the platen) in order to satisfy the aforementioned relationships representing image and object conjugate distance. Conversely, when the lens is moved from a smaller magnification position to a larger magnification position (i.e. the lens is moved farther away from the image plane) then the mirrors 16 and 18 must be moved closer to the object plane in order to satisfy the above relationships representing image and object conjugate distances. The cable 54 (FIG. 2) is redundantly wrapped about the pulley 38 to thereby ensure precise spacing which is at all times maintained between the half-rate mirror 16 and 18 and the lens 20, while the redundant wrapping of the cable 30 about the pulley 36 ensures accurate spacing between the full-rate and half-rate mirrors.

As will be appreciated when a magnification change is to be accomplished it will be necessary to prevent the cable 30 from moving. To this end, an electromagnetic clutch mechanism 75 may be associated with the pulley 28 to thereby clutch the pulley 28 when a magnification change is made. Also, another clutch 76 may be associated with the pulley 60 to preclude movement of the cable 54 during a scanning operation to thereby maintain lens 20 in a fixed position.

While the present invention has been principally described as a cable and pulley arrangement for effecting a precision magnification charge, the same arrangement is also utilized as disclosed for accomplishing movement of a full rate mirror at one speed and a half rate mirror cluster at half the speed of the full rate mirror. The cable and pulley arrangement can also be utilized in a moving lens system for imparting the necessary movement to the lens and the exposure lamp. Accordingly, it is intended that the invention be limited only by the claims appended hereto and not by the preferred embodiment as disclosed hereinbefore.

What is claimed is:

1. Optical projection apparatus utilizing a pulley and cable mechanism for positioning optical components thereof, said apparatus comprising:

fixed pulley means;
translatable pulley means;
a cable entrained about said fixed pulley and said translatable pulley means;
means for selectively preventing rotation of said fixed pulley means; and
means for effecting translation of said translatable pulley means simultaneously with the prevention of rotation of said fixed pulley means whereby the spacing between said translatable pulley means and fixed pulley means can be varied.

2. Apparatus according to claim 1 including means for imparting rotational motion to said fixed pulley means and simultaneously imparting translational movement to said translatable pulley means via said cable, said means for preventing rotation of said fixed pulley being inoperative at that time.

3. Apparatus according to claim 1 including a first optical component operatively associated with said translatable pulley means for movement in synchronism therewith; and a second optical component operatively coupled to said cable for movement therewith.

4. Apparatus according to claim 3 wherein said cable is wrapped about said translatable pulley means and said fixed pulley means such that said optical components move in the same direction.

5. Apparatus according to claim 3 wherein said cable is wrapped about said translatable pulley means and said fixed pulley means such that said optical components move in the opposite direction.

6. Apparatus according to claim 4 wherein said first optical component comprises a first reflector means and said second optical component comprises a second reflector means.

7. Apparatus according to claim 5 wherein said first and second optical components comprise mirror means and lens means, respectively.

8. Apparatus according to claim 1 including a another cable and another fixed pulley means, said another cable being entrained about said translatable pulley means and said another fixed pulley means;

said apparatus further including means for selectively preventing rotation of said another fixed pulley means to thereby enable repositioning of said translatable pulley means relative to said another fixed pulley means upon movement of said translatable pulley means with the rotation of said fixed pulley means.

9. Apparatus according to claim 8 including a first optical component supported for movement by said translatable pulley means;

a second optical component supported for movement by said cable;
a third optical component operatively associated with said another cable;
means for repositioning said third optical component in one direction and effecting simultaneous movement of said second optical component in another direction when said fixed pulley means is prevented from rotating.

10. Apparatus according to claim 9 wherein said first and second optical components comprise reflector means and said third optical component comprises lens means.

11. Apparatus according to claim 10 including means for imparting rotational movement to said fixed pulley means while said second fixed pulley means is prevented from rotating whereby said first and second optical components move simultaneously and said third optical component remains stationary.

12. Apparatus according to claim 11 wherein said cable is wrapped about said translatable pulley means such that said reflector means move in the same direction.

13. Apparatus according to claim 12 wherein said second cable is wrapped about said translatable pulley means such that said second and third optical components move in opposite directions upon repositioning of said third optical component.

14. Apparatus according to claim 13 wherein said translatable pulley means comprises a pair of rotatable pulleys coupled by a shaft.

15. Apparatus according to claim 14 wherein said fixed and said another fixed pulley means comprise pulley pairs with said translatable pulley means disposed intermediate thereof.

16. Apparatus according to claim 15 wherein said cable and said second cable comprise endless loops.

* * * * *